(12) United States Patent
Li et al.

(10) Patent No.: US 12,287,741 B2
(45) Date of Patent: Apr. 29, 2025

(54) METHOD AND APPARATUS FOR SOLVING CACHE ADDRESS ALIAS

(71) Applicant: BEIJING VCORE TECHNOLOGY CO., LTD., Beijing (CN)

(72) Inventors: Zusong Li, Beijing (CN); Dandan Huan, Beijing (CN)

(73) Assignee: BEIJING VCORE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/246,196

(22) PCT Filed: Mar. 21, 2022

(86) PCT No.: PCT/CN2022/082036
§ 371 (c)(1),
(2) Date: Mar. 22, 2023

(87) PCT Pub. No.: WO2023/108938
PCT Pub. Date: Jun. 22, 2023

(65) Prior Publication Data
US 2024/0303202 A1    Sep. 12, 2024

(30) Foreign Application Priority Data
Dec. 17, 2021    (CN) .......................... 202111548542.9

(51) Int. Cl.
*G06F 12/10* (2016.01)
*G06F 12/0888* (2016.01)
*G06F 12/1045* (2016.01)

(52) U.S. Cl.
CPC ...... *G06F 12/1063* (2013.01); *G06F 12/0888* (2013.01); *G06F 2212/1032* (2013.01); *G06F 2212/657* (2013.01)

(58) Field of Classification Search
CPC ............. G06F 12/1063; G06F 12/0888; G06F 12/1045; G06F 12/0815; G06F 2212/1021;
(Continued)

(56) References Cited

U.S. PATENT DOCUMENTS 5,109,335 A * 4/1992 Watanabe ........... G06F 12/1054
711/E12.063
5,860,138 A * 1/1999 Engebretsen ............. G06F 9/35
711/3
(Continued)

FOREIGN PATENT DOCUMENTS

CN        1506843     *  6/2004
CN      107066396        8/2017
(Continued)

OTHER PUBLICATIONS

WIPO, International Search Report and Written Opinion for PCT/CN2022/082036, Aug. 26, 2022.
(Continued)

*Primary Examiner* — Tracy C Chan
(74) *Attorney, Agent, or Firm* — Hodgson Russ LLP (57) ABSTRACT

A method for solving a Cache address alias and an apparatus for solving a Cache address alias are provided. The method includes determining a corresponding first virtual address based on a received access instruction; querying an address maintenance list to determine a target item corresponding to the first virtual address when an access based on the first virtual address is not hit, information recorded in the target item including a target Tag, a target address alias bit, and a target Cache; determining a second virtual address based on the first virtual address and the target item, and setting information in the second virtual address to be invalid, in which the second virtual address and the first virtual address are mapped to the same physical address; and acquiring (Continued)

| Tag 1 | Address Alias Bit 1 | Processor Core First Identifier 1 | Cache Second Identifier 1 |
|---|---|---|---|
| Tag 2 | Address Alias Bit 2 | Processor Core First Identifier 2 | Cache Second Identifier 2 |
| ...... | ...... | ...... | ...... |
| Tag n | Address Alias Bit n | Processor Core First Identifier n | Cache Second Identifier n | information corresponding to the access instruction and writing it back to the first virtual address.

20 Claims, 8 Drawing Sheets

(58) Field of Classification Search
CPC ....... G06F 2212/1032; G06F 2212/657; G06F 2212/608; G06F 13/1668; G06F 13/4027; G06F 13/28
See application file for complete search history.

(56) References Cited

U.S. PATENT DOCUMENTS

| | | | |
|---|---|---|---|
| 7,552,254 B1* | 6/2009 | George | G06F 9/34 |
| | | | 710/52 |
| 8,417,915 B2 | 4/2013 | Gilday et al. | |
| 2011/0231593 A1* | 9/2011 | Yasufuku | G06F 12/0831 |
| | | | 711/3 |
| 2013/0185520 A1* | 7/2013 | Dieffenderfer | G06F 12/1045 |
| | | | 711/144 |
| 2014/0095784 A1 | 4/2014 | Tran et al. | |
| 2014/0164702 A1 | 6/2014 | Yasufuku et al. | |
| 2019/0087333 A1* | 3/2019 | Robinson | G06F 13/1668 |
| 2019/0087339 A1* | 3/2019 | Recktenwald | G06F 12/0828 |
| 2019/0332551 A1* | 10/2019 | Siegel | G06F 3/061 |
| 2020/0250099 A1* | 8/2020 | Campbell | G06F 12/145 |

FOREIGN PATENT DOCUMENTS

| | | |
|---|---|---|
| CN | 107111455 | 8/2017 |
| CN | 112753024 | 5/2021 |
| CN | 113934655 | 1/2022 |
| WO | 2021234351 | 11/2021 |

OTHER PUBLICATIONS

CNIPA, First Office Action for CN Application No. 202111548542.9, Jan. 21, 2022.
EPO, Extended European Search Report for EP Application No. 22868428.8, Jul. 26, 2024.

* cited by examiner

| Tag 1 | Address Alias Bit 1 | Processor Core First Identifier 1 | Cache Second Identifier 1 |
| Tag 2 | Address Alias Bit 2 | Processor Core First Identifier 2 | Cache Second Identifier 2 |
| ...... | ...... | ...... | ...... |
| Tag n | Address Alias Bit n | Processor Core First Identifier n | Cache Second Identifier n |

METHOD AND APPARATUS FOR SOLVING CACHE ADDRESS ALIAS

CROSS-REFERENCE TO RELATED APPLICATIONS

This application is a U.S. national stage entry of International Patent Application No. PCT/CN2022/082036, filed on Mar. 21, 2022, which claims priority to Chinese Patent Application No. 202111548542.9, filed on Dec. 17, 2021, the entire disclosures of which are incorporated herein by reference.

FIELD

The present disclosure relates to the technical field of electronics, especially to a method for solving a Cache address alias, and an apparatus for solving a Cache address alias.

BACKGROUND

In the field of electronic technology, a computer device may determine an address of a fetch instruction via a program counter, determine an address of an access memory via a memory access instruction, and then fetch an instruction, or read and write data from a physical address indicated by the address.

If a virtual address is taken as a Cache index, when a sum of the number of bits of the Cache Index and a Cache block offset is greater than the number of bits of a page offset, there may be different high-order bits in Indexes of two memory addresses that exceed the page offset. This is caused by a mapping of a same physical address to different virtual addresses, so that different Cache lines may be addressed based on the index, which is actually the same physical address, i.e., there is an address alias. Correspondingly, a corresponding bit in the Cache Index where the virtual address and the physical address are not equal may be referred to as an address alias bit in the present disclosure.

SUMMARY

To solve the problems in the prior art, embodiments of the present disclosure provide a method for solving a Cache address alias, an apparatus for solving a Cache address alias, an electronic device, and a non-transitory computer-readable storage medium.

According to an aspect of the present disclosure, there is provided a method for solving a Cache address alias. The method includes determining a corresponding first virtual address based on a received access instruction to a Cache; querying an address maintenance list to determine a target item corresponding to the first virtual address when an access based on the first virtual address does not result in a hit in a Tag of the Cache, information recorded in the target item being configured to indicate a target Tag, a target address alias bit, and a target Cache; determining a second virtual address based on the first virtual address and the target item, and setting information in the second virtual address to be invalid, in which the second virtual address and the first virtual address are mapped to the same physical address; and acquiring information corresponding to the access instruction and writing the information corresponding to the access instruction back to the first virtual address.

According to another aspect of the present disclosure, there is provided an apparatus for solving a Cache address alias. The apparatus includes a receiving module configured to determine a corresponding first virtual address based on a received access instruction to a Cache; a querying module configured to query an address maintenance list to determine a target item corresponding to the first virtual address when an access based on the first virtual address does not result in a hit in a Tag of the Cache, information recorded in the target item including a target Tag, a target address alias bit, and a target Cache; an invalidation module configured to determine a second virtual address based on the first virtual address and the target item, and set information in the second virtual address to be invalid, in which the second virtual address and the first virtual address are mapped to the same physical address; and an acquisition module configured to acquire information corresponding to the access instruction and write the information corresponding to the access instruction back to the first virtual address.

According to another aspect of the present disclosure, there is provided an electronic device including a processor; and a memory for storing a program; in which the program includes an instruction that, when executed by the processor, causes the processor to perform the above-mentioned method for solving the Cache address alias.

According to another aspect of the present disclosure, there is provided a non-transitory computer-readable storage medium having stored therein computer instructions, in which the computer instructions are configured to cause a computer to perform the above-mentioned method for solving the Cache address alias.

According to another aspect of the present disclosure, there is provided a computer program product, in which the computer program product includes a computer program code that, when run on a computer, performs the above-mentioned method for solving the Cache address alias.

According to another aspect of the present disclosure, there is provided a computer program, in which the computer program includes a computer program code that, when run on a computer, causes the computer to perform the above-mentioned method for solving the Cache address alias.

In the present disclosure, the address maintenance list may be employed to determine whether address alias exists, and if so, the consistency between the virtual address and the physical address may be maintained based on the address maintenance list. In addition, the address maintenance list has a small amount of data and is easy to maintain, so that the processing efficiency may be improved while the address alias is solved.

BRIEF DESCRIPTION OF THE DRAWINGS

Further details, features, and advantages of the present disclosure are disclosed in the following description of illustrative embodiments in conjunction with the accompanying drawings.

DETAILED DESCRIPTION

Embodiments of the present disclosure will be described in more detail below with reference to the accompanying drawings. Although some embodiments of the present disclosure are shown in the accompanying drawings, it is to be understood that the present disclosure may be implemented in various forms and should not be construed as limited to the embodiments described herein. On the contrary, these embodiments are provided for a more thorough and complete understanding of the present disclosure. It is to be understood that the accompanying drawings and embodiments of the present disclosure are only for illustrative purposes, and are not intended to limit the scope of protection of the present disclosure.

It is to be understood that steps described in the method embodiments of the present disclosure may be performed in different order and/or in parallel. In addition, the method embodiments may include additional steps and/or omit the steps shown. The scope of the present disclosure is not limited in this respect.

As used herein, the term "including" and its variations are open including, that is, "including but not limited to". The term "based on" means "at least partly based on". The term "one embodiment" means "at least one embodiment". The term "another embodiment" means "at least one other embodiment". The term "some embodiments" means "at least some embodiments". Relevant definitions of other terms will be given in the following description. It is to be noted that concepts of "first" and "second" mentioned in the present disclosure are only used to distinguish different apparatuses, modules or units, and are not used to limit the order or interdependence of the functions performed by these apparatuses, modules or units.

It is to be noted that modifications of "one" and "multiple" mentioned in the present disclosure are illustrative rather than restrictive, and those skilled in the art should understand that they should be understood as "one or more" unless the context clearly indicates otherwise.

Names of messages or information exchanged between multiple apparatuses in the embodiments of the present disclosure are only for illustrative purposes, and are not intended to limit the scope of these messages or information.

In order to clearly describe the method provided by the embodiments of the present disclosure, the techniques used are described below.

Figure 1:
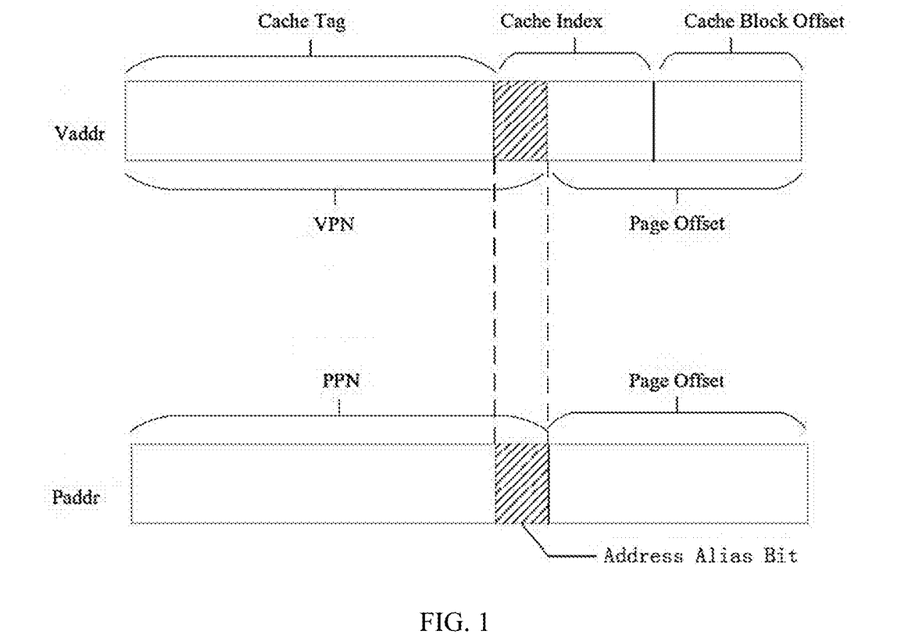
FIG. 1 is a schematic diagram showing a memory address.

As shown in the schematic diagram of the memory address in FIG. 1, from the perspective of an operating system, the memory address may be divided into a virtual address (abbreviated as Vaddr or VA) and a physical address (abbreviated as Paddr or PA). The virtual address may be divided into two parts, a virtual page number (abbreviated as VPN) and a page offset. The physical Address (abbreviated as PA) may be divided into two parts, a physical page number (abbreviated as PPN) and a page offset.

From the perspective of a Cache of a processor, the memory address may be divided into three parts, a Cache Tag, a Cache Index, and a Cache block offset.

1. Cache

A Cache, located between a central processing unit (CPU) and a dynamic random access memory (DRAM), usually consists of a static random-access memory (SRAM). A speed of the CPU is much higher than that of a memory. It needs to wait for a certain clock cycle when the CPU accesses data directly from the memory, while the Cache has a fast access speed, which may save part of information that the CPU has just used or recycled. If the CPU needs to use this part of information again, it may be called directly from the Cache, thus avoiding accessing information from the memory with a long latency, reducing waiting time of the CPU, and thus improving the efficiency of a system.

Figure 2:
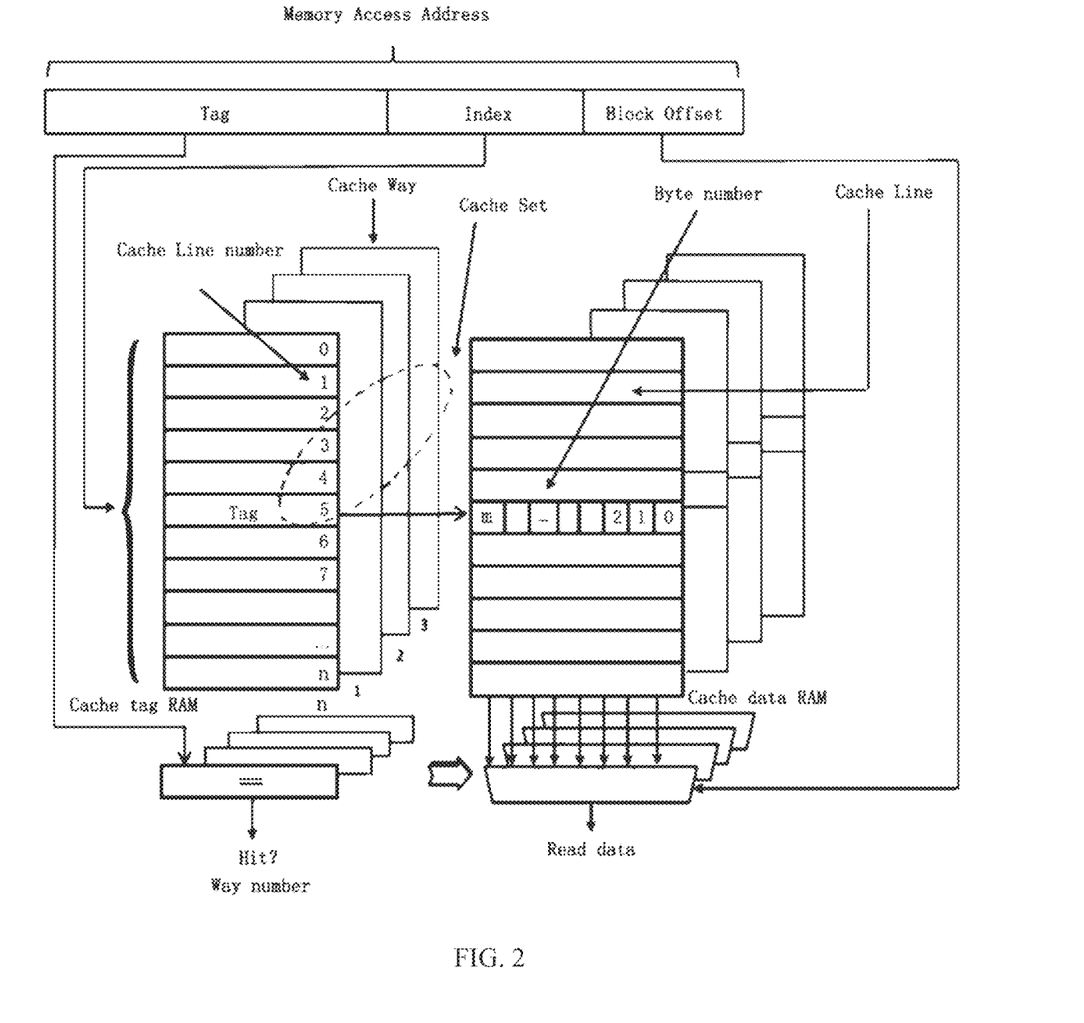
FIG. 2 is a schematic diagram showing a Cache structure according to an embodiment of the present disclosure.

As shown in the schematic diagram of the Cache in FIG. 2, the Cache mainly consists of two parts, a Tag part and a data part. The data part is configured to store a piece of continuous address information, and the Tag part is configured to store a public address of the piece of continuous information. A Tag and all its corresponding information form a line referred to as a Cache line, and a data part in the Cache line is referred to as a data block. If a piece of information may be stored in multiple locations in the Cache, these multiple Cache lines found by the same address are referred to as a Cache set.

2. Organization of Cache

Figure 3:
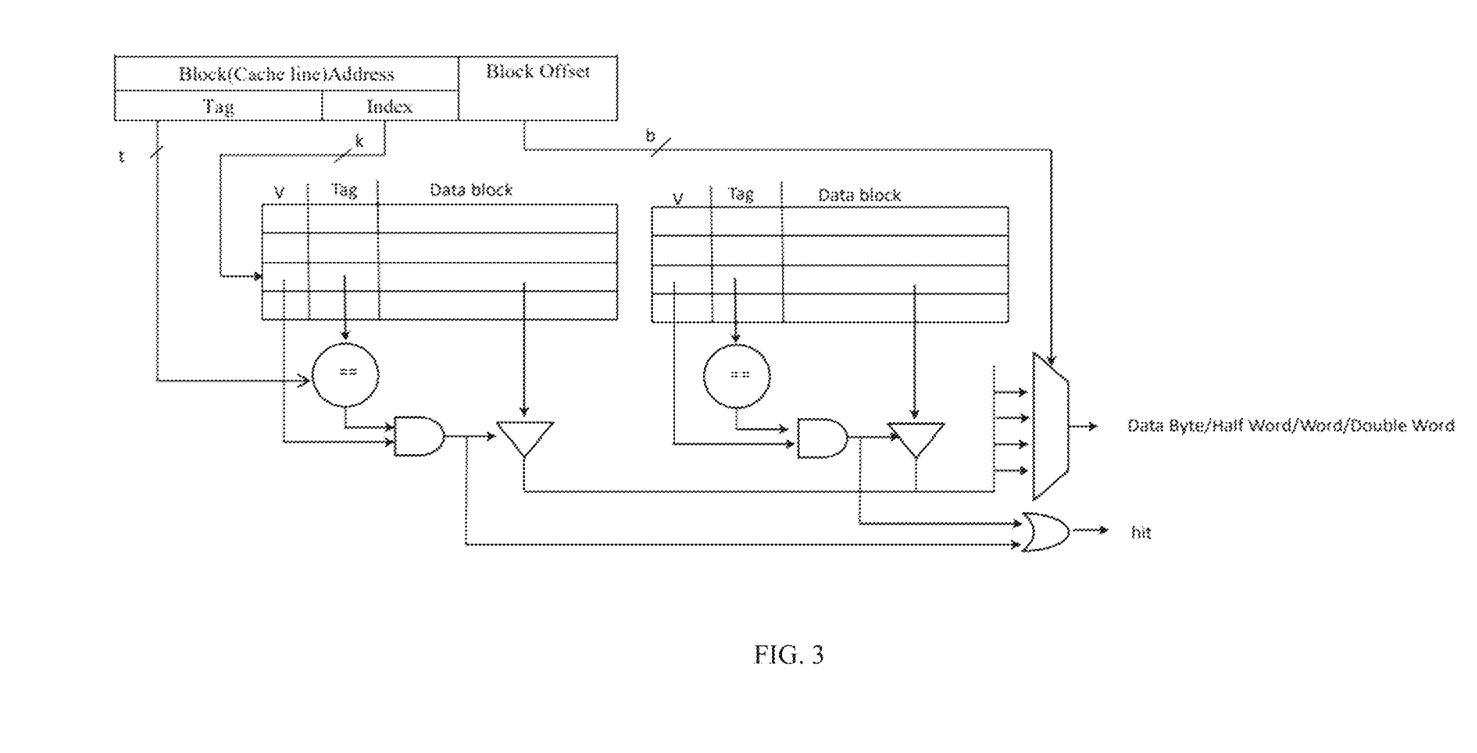
FIG. 3 is a schematic diagram showing a set associative Cache structure according to an embodiment of the present disclosure.

The organization of Cache is divided into directly associative, set associative, and fully associative. The present disclosure mainly relates to organization of the set associative. The directly associative and the fully associative may be regarded as a special organization of set associative with way number of 1 and way number of Cache lines, respectively. The schematic diagram of the set associative Cache is shown in FIG. 3.

An address at which the processor accesses the memory may be divided into three parts, a Tag, an Index and a block offset. Use the Index to find a set of Cache lines from the cache, that is, a Cache set. Use the Tag part read out by the Index to compare with the Tag in the access address. Only if they are equal, it indicates that the Cache line is the desired one. There are a lot of corresponding memory access information in one Cache line. The really desired information may be found through the block offset part of the memory address and an access width of a memory access instruction, and it may be located to each byte. There is also a valid bit in the Cache line, which is used to mark whether the Cache line stores valid information. Only at a previously accessed memory address, its information will be present in the corresponding Cache line, and the corresponding valid bit will be set to 1.

3. Address Alias

The address alias means that different virtual addresses correspond to a same physical address.

The reason for address alias is described below.

An address that accesses the Cache may be a virtual address or a physical address. An address of an instruction fetched by a processor and an address in the instruction executed by the processor are both virtual addresses, and a virtual-real address conversion needs to be performed via a translation lookaside buffer (TLB) to obtain the physical address. From the perspective of Cache access efficiency, commercial processors generally use virtual address Indexes to access Cache lines, and a physical address Tag is used for Tag comparison. That is, Cache memory addresses consist of the virtual address Index and the physical address Tag (Virtually-Indexed, Physically-Tagged, VIPT) at this time.

In such a method, access to the Cache and the TLB may be performed simultaneously. Assume that in a directly mapped Cache, each Cache line contains 2b bytes of information, and the number of Cache set is 2L. That is, the number of bits of the index+block offset of the virtual address is L+b. Assuming that a page size in the physical address is 2 k bytes, the number of bits of the page offset is k.

Figure 4:
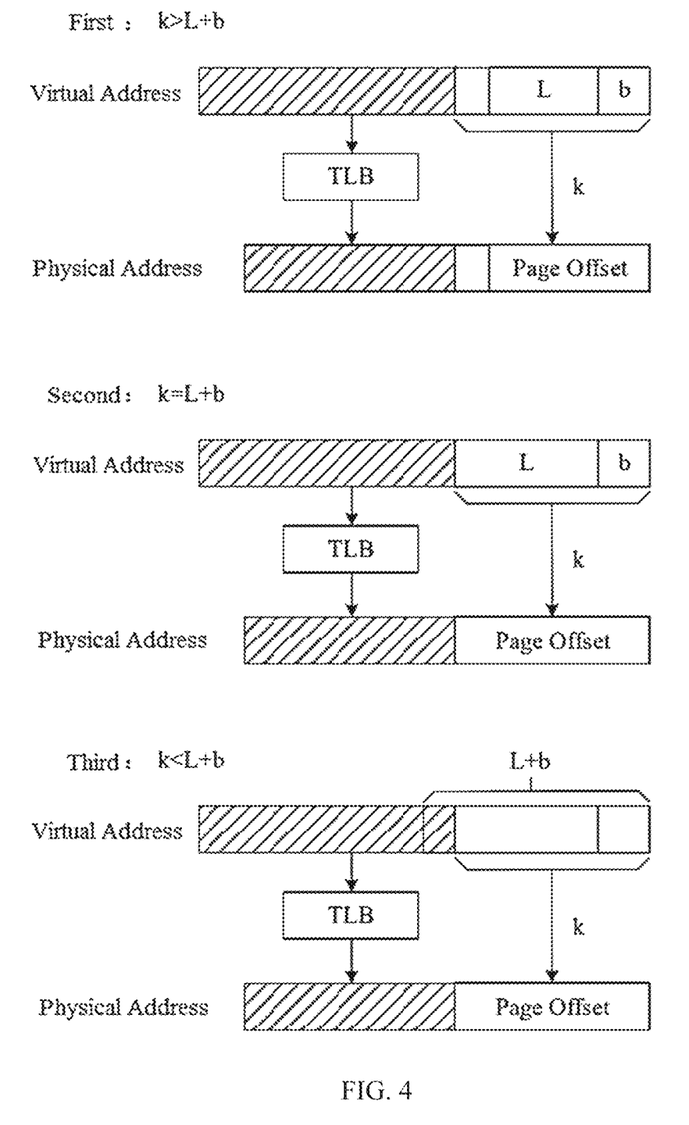
FIG. 4 is a schematic diagram showing the number of bits of an index+block offset and a page offset according to an embodiment of the present disclosure.

Therefore, there may be three cases as shown in FIG. 4.

First, k>L+b, where a capacity of the Cache is less than a size of a page.

Second, k=L+b, where a capacity of the Cache is equal to a size of a page.

Third, k<L+b, where a capacity of the Cache is larger than a size of a page.

For the above-mentioned first and second cases, in a process of the virtual-real address conversion, the index+block offset in the virtual address will not change in a process of converting the virtual address into the physical address, which may be considered as coming from the physical address. It is equivalent to the direct use of a physical address Index and a physical address Tag (Physically-Indexed, Physically-Tagged, PIPT), and address alias does not occur in this case.

However, for the above-mentioned third case, since there is a limit on a capacity of 1-way Cache (e.g., 4 KB), if it is desired to increase the capacity of the Cache, it is necessary to increase the number of ways (e.g. to 32 KB, corresponding to an 8-way set associative structure) by using the Cache of the set associative structure. However, the number of ways is limited by access time of the Cache, so it is impossible to increase the number of ways indefinitely in the set associative structure Cache. Therefore, it may only increase a capacity of each way. At this time, the number of bits of the Index in the virtual address is increase, so that the number of bits of the index+block offset in the virtual address is greater than the number of bits of the page offset in the physical address, that is, k<L+b.

Since the page offset of the physical address corresponds to a [k-1, 0] part of the virtual address, the index+block offset of the virtual address corresponds to a [L+b-1, 0] part. There may be cases where [k-1, 0] parts of two virtual addresses VA1 and VA2 are the same, but [L+b-1, 0] parts are different. That is, the same physical address may be addressed based on the [k-1, 0] part, but different virtual addresses may be addressed based on the [L+b-1, 0] part. That is, there is an address alias. The address alias will not only waste Cache space, but also information of the VA1 will not change when information corresponding to the VA2 in the Cache is changed, resulting in that one physical address has two different pieces of information in the Cache. When a subsequent fetch instruction reads information from the address VA1, the read information will be unchanged, resulting in an information reading error.

Therefore, the embodiments of the present disclosure provide a method for solving a Cache address alias, which may be applied to a terminal, a server and/or other electronic devices with processing capabilities, which is not limited in the present disclosure.

Figure 5:
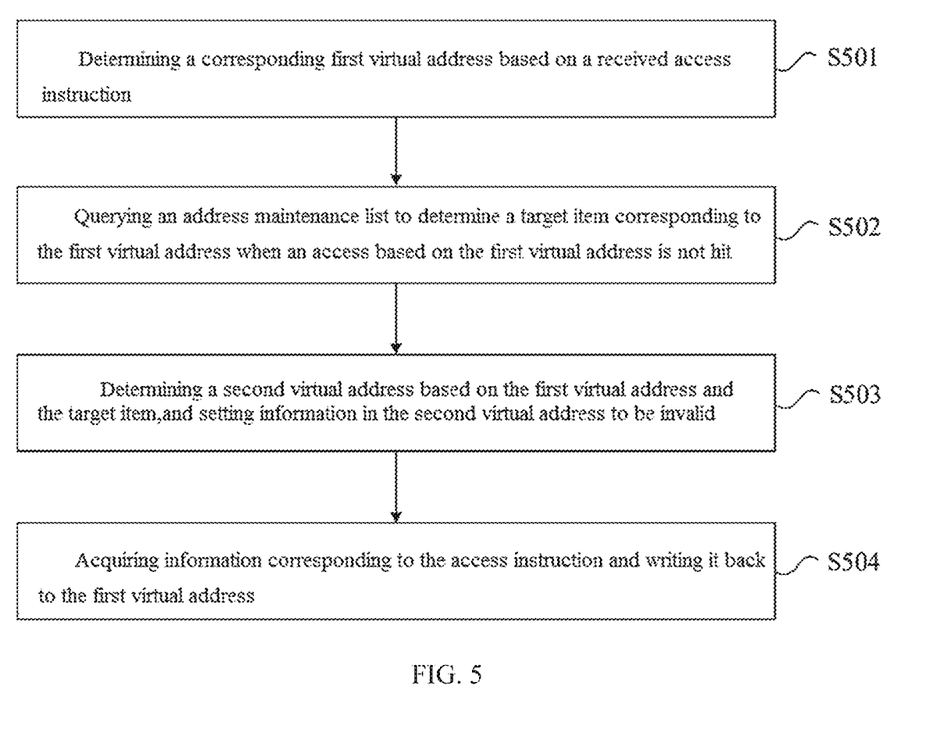
FIG. 5 is a flow chart showing a method for solving a Cache address alias according to an embodiment of the present disclosure.

The method will be described below with reference to the flow chart of the method for solving the Cache address alias shown in FIG. 5.

In step 501, a corresponding first virtual address is determined based on a received access instruction.

In step 502, an address maintenance list is queried to determine a target item corresponding to the first virtual address when an access based on the first virtual address is not hit, in which information recorded in the target item may include a target Tag, a target address alias bit, and a target Cache.

In step 503, a second virtual address is determined based on the first virtual address and the target item, and information in the second virtual address is set to be invalid, in which the second virtual address and the first virtual address are mapped to the same physical address.

In step 504, information corresponding to the access instruction is acquired and written the information corresponding to the access instruction back to the first virtual address.

In some embodiments, the method may further include updating the address maintenance list based on the first virtual address.

In some embodiments, updating the address maintenance list based on the first virtual address includes updating the target address alias bit to an address alias bit of the first virtual address, when the address alias bit of the first virtual address is not equal to the target address alias bit.

In some embodiments, the target Cache includes at least any one of: an instruction Cache or a data Cache of a current processor core, or an instruction Cache or a data Cache of another processor core, in which the current processor core is configured to receive the access instruction.

In some embodiments, determining the corresponding first virtual address based on the received access instruction includes acquiring a first virtual address corresponding to a fetch instruction when the fetch instruction is received, the first virtual address corresponding to the fetch instruction being configured to access an instruction Cache; or determining a first virtual address corresponding to a memory access instruction when the memory access instruction is received, the first virtual address corresponding to the memory access instruction being configured to access a data Cache.

In some embodiments, acquiring the first virtual address corresponding to the fetch instruction includes acquiring the first virtual address corresponding to the fetch instruction based on a program counter.

In some embodiments, querying the address maintenance list to determine the target item corresponding to the first virtual address includes determining a target item with a Tag that is equal to a Tag of the first virtual address based on the address maintenance list.

In some embodiments, determining the target item with the Tag which is equal to the Tag of the first virtual address based on the address maintenance list includes traversing the address maintenance list to determine whether a Tag of each item is equal to the Tag of the first virtual address; if yes, taking the corresponding item as the target item of the first virtual address; or acquiring at least one item corresponding to an Index in the address maintenance list based on the Index of the physical address; in the at least one item, taking one item with a Tag that is equal to the Tag of the first virtual address as the target item.

In some embodiments, the method further includes generating a target item if the target item corresponding to the first virtual address does not exist in the address maintenance list, and adding the target item into the address maintenance list.

In some embodiments, generating the target item includes generating the target item by taking a Tag of the first virtual address or the physical address as the target Tag, taking an address alias bit of the first virtual address as the target address alias bit, and taking a current Cache corresponding to the first virtual address as the target Cache.

In some embodiments, determining the second virtual address based on the first virtual address and the target item, and setting the information in the second virtual address to be invalid includes replacing an address alias bit with the address alias bit of the target item in the first virtual address to obtain a second virtual address; accessing the target Cache, and setting information in the second virtual address to be invalid in the target Cache.

In some embodiments, acquiring the information corresponding to the access address and writing the information corresponding to the access address back to the first virtual address includes acquiring the information in the second virtual address and writing the information in the second virtual address back, and filling the written back information into the first virtual address; or acquiring information in the physical address, and filling the information into the first virtual address.

In some embodiments, the first virtual address and the second virtual address are configured to access a L1 Cache.

In some embodiments, the address maintenance list is a list of snoop filter.

In some embodiments, a list domain of the address maintenance list includes a Tag, an address alias bit and Cache information.

In some embodiments, the Cache information includes a first identification of a processor core and a second identification of a Cache, the first identification being configured to indicate a processor core to which the Cache belongs, and the second identification being configured to indicate that the Cache is an instruction Cache or a data Cache.

In an embodiment of the present disclosure, the Tag of the memory address, the address alias bit, and the target Cache for storing instructions or data may be recorded based on the address maintenance list, and the consistency between the physical address and the virtual address may be maintained by using the address maintenance list to ensure that one physical address only corresponds to one virtual address storing valid information. Since the address maintenance list has a small amount of data and is easy to maintain, so that the processing efficiency may be improved while the address alias is solved.

An access method for solving a Cache address alias provided by the present disclosure will now be described starting with the first retrieval of information. Embodiments of the present disclosure will be discussed based on the same physical address.

Figure 6:
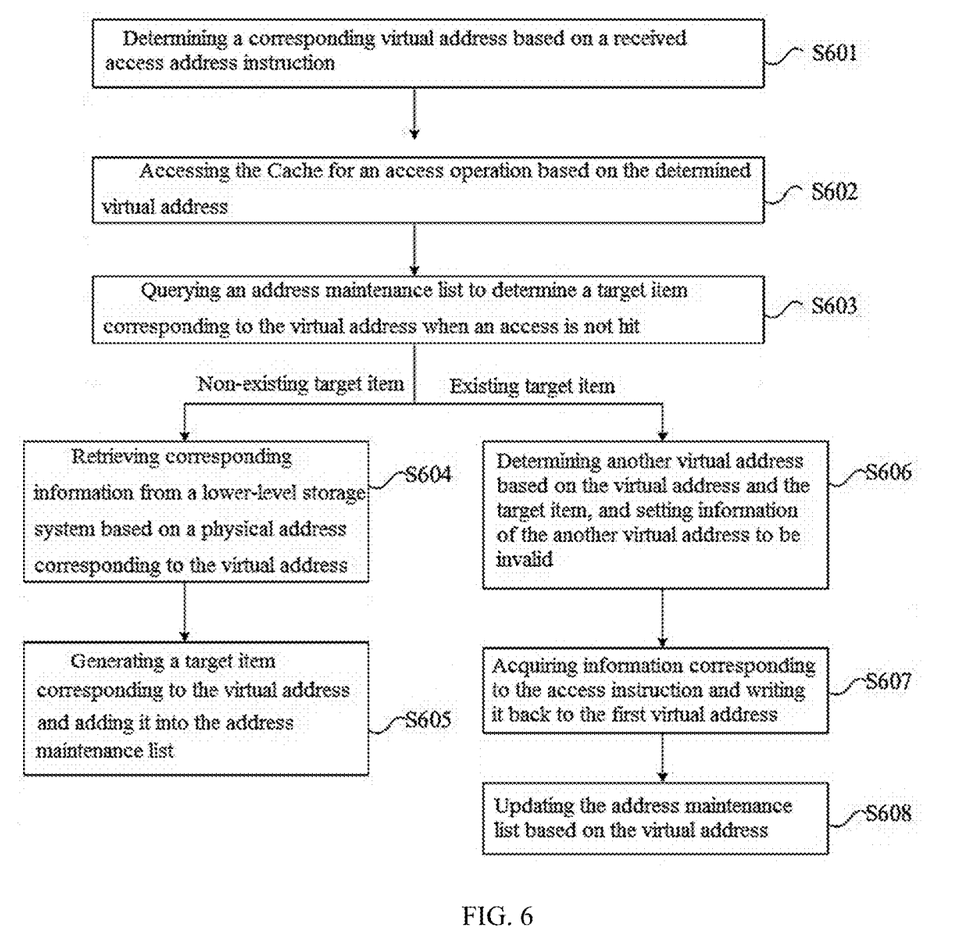
FIG. 6 is a flow chart showing an access method according to an embodiment of the present disclosure.

Referring to the flow chart of the memory access method shown in FIG. 6, the memory access method is as follows.

In step 601, a corresponding virtual address is determined based on a received access instruction.

The access instruction may include a fetch instruction to the instruction Cache, and may further include a memory access instruction to a data Cache. The memory access instruction is a fetch instruction for fetching an operand in a storage unit indicated by an instruction address code or a memory instruction for writing. Correspondingly, information stored in the virtual address may include data and an instruction.

In a possible implementation, any processor core may receive an access to the Cache when an electronic device is running. For example, when the device performs a certain calculation task, it may trigger a corresponding memory access instruction to acquire data needed for calculation. The embodiment does not limit a specific task of triggering the memory access instruction.

Furthermore, the current processor core may calculate the corresponding virtual address based on a base address and an offset in the access instruction. The virtual address may be configured to access a Cache of the current processor core, that is, the current Cache corresponding to the virtual address. In some embodiments, the corresponding base address is acquire from a register based on an identifier of a base address register carried in the access instruction, and the corresponding virtual address is determined by adding the base address and the offset.

In some embodiments, the fetch instruction and the memory access instruction may have different methods for determining the virtual address, and the specific processing may be as follows.

When the fetch instruction is received, a first virtual address corresponding to the fetch instruction is acquired; or when the memory access instruction is received, a first virtual address corresponding to the memory access instruction is determined.

The first virtual address corresponding to the fetch instruction is configured to access an instruction Cache, and the first virtual address corresponding to the memory access instruction is configured to access a data Cache.

In some embodiments, for the fetch instruction, the first virtual address of the fetch instruction may be acquired based on a program counter (PC). A value in the program counter may be configured to indicate a position of the current instruction in the instruction Cache, which is a virtual address of the access instruction Cache.

For the memory access instruction, the corresponding base address may be acquired from the register based on the identifier of the base address register carried in the instruction, and the corresponding virtual address may be determined by adding the base address and the offset.

In step 602, the Cache is accessed for an access operation based on the determined virtual address.

The virtual address may include a Tag, an Index and a block offset.

In some embodiments, the Cache accessed here may be a L1 Cache, which may be a level 1 instruction Cache (L1 I-Cache), or a Level 1 data Cache (L1 D-Cache). On this basis, a L2 Cache may no longer maintain an inclusion relationship with the L1 Cache. That is, the L2 Cache may no longer store all non-inclusive information stored in the L1 Cache, thus reducing the occupation of space, making the L2 Cache have more space to handle other tasks and improving the performance of a system.

In a possible implementation, a corresponding set of Cache lines may be determined from the Cache based on the Index of the virtual address. That is, a Cache set may be found. Based on the Tag of virtual address, it may be determined whether a Tag of each Cache line in a determined set of Cache lines is the same as a Tag of a target address, and whether a valid bit indicates to store valid information, that is, whether the Tag hits. If there is a hit, that is, the Tag of the Cache line is the same as the Tag of the target address, and the valid bit is 1, indicating that the valid information is stored, then a data block in a hit target Cache line is selected by a selector, and information is read or stored according to a corresponding position of a block offset in the data block. If there is not a hit, that is, the Tag of the Cache line is different from the Tag of the target address, or the valid bit is 0, indicating that no valid information is stored, it may jump to step 603 for execution.

When the access to the Cache line is triggered for the first time, or the information for the Cache line has been replaced, accessing the Cache based on the virtual address will be not hit, and then it may jump to step 603 for execution.

In step 603, an address maintenance list is queried to determine a target item corresponding to the virtual address when an access is not hit.

Figure 7:
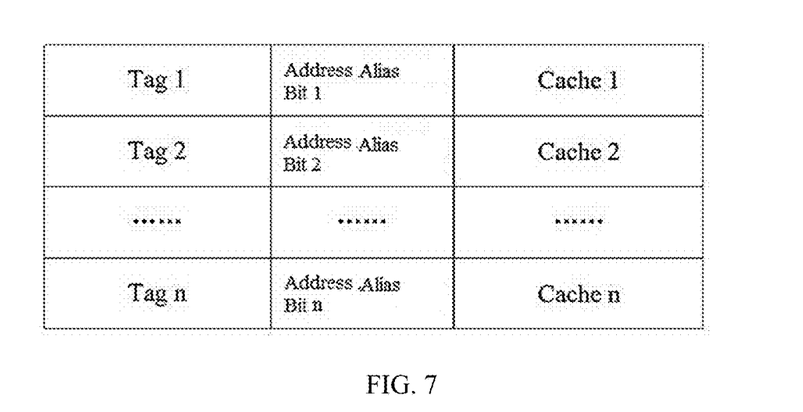
FIG. 7 is a schematic diagram showing an address maintenance list according to an embodiment of the present disclosure.

As shown in the schematic diagram of the address maintenance list in FIG. 7, a plurality of items of information may be recorded in the address maintenance list, and each list domain may include a Tag, an address alias bit of the virtual address and Cache information. In some embodiments, the above-mentioned Tag may refer to a Tag of the physical address. The address maintenance list may be configured to maintain the consistency between the physical address and the virtual address. The physical address and virtual address indicated in an item are a pair of virtual and real addresses that are mapped to each other.

Figure 8:
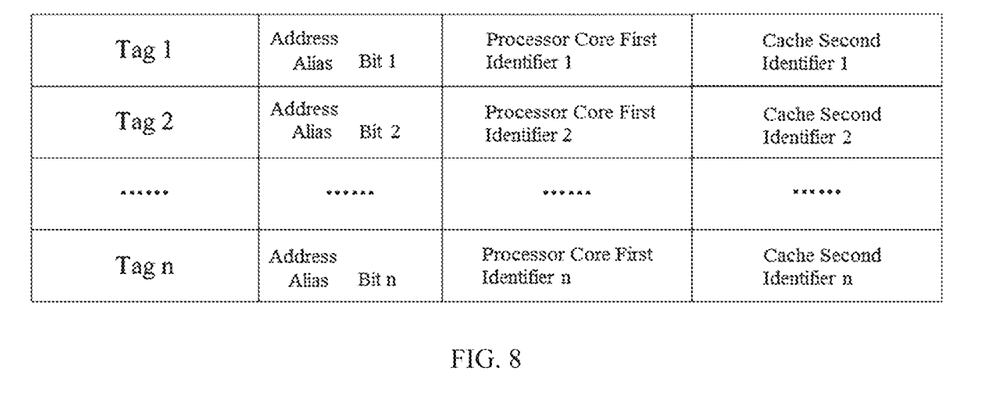
FIG. 8 is a schematic diagram showing another address maintenance list according to an embodiment of the present disclosure.

The Cache information is configured to indicate the Cache that stores valid information. In some embodiments, as shown in FIG. 8, the Cache information may further include a first identifier of the processor core and a second identifier of the Cache. The first identifier may be configured to indicate the processor core to which the Cache belongs, and the second identifier may be configured to indicate that the Cache is an instruction Cache or a data Cache.

In some embodiments, the Tag of the physical address may be 28'h0080009. The address alias bit of the virtual address may be 2'b01. The Cache information may include a bit vector of the processor core (i.e., the first identifier), such as 0001, which means that in a quad-core processor, a 4th processor core stores valid information of the physical address, and a inst bit (i.e., the second identifier) is configured to identify that the Cache is the instruction Cache or the data Cache. The inst bit of 1 indicates the instruction Cache and the inst bit of 0 indicates the data Cache. The bit vector of the processor core and the inst bit together constitute the Cache information.

In some embodiments, the address maintenance list may be a list of snoop filter. Snoop filter mechanism is adopted to monitor the fetch instruction or the memory access instruction and maintain the address maintenance list, which may avoid using the L2 Cache to solve the address alias. Of course, the address maintenance list may also be other forms of directories, which have in common that they may be used to maintain consistency. The embodiment does not limited to a specific form of directories.

The corresponding processing in step 603 may be as follows. A target item with a Tag that is equal to a Tag of the virtual address is determined based on the address maintenance list.

The address maintenance list may be organized similarly to the Cache, i.e., fully associative, directly associative and set associative.

In a first possible embodiment, the address maintenance list is organized in a fully associative manner. In step 603, the address maintenance list may be traversed to determine whether a Tag of each item is equal to the Tag of the first virtual address. If yes, the corresponding item is taken as the target item of the first virtual address.

In a second possible embodiment, the address maintenance list is organized in a directly associative manner. At this time, the Index of each item in the address maintenance list may correspond to the Index of the physical address. On this basis, in step 603, one item corresponding to an Index may be acquired in the address maintenance list based on the Index of the physical address. In the above-mentioned one item, it is determined whether a Tag of the item is equal to the Tag of the first virtual address. If yes, the item is taken as the target item of the first virtual address.

For example, one item of table information in a fifth line may be acquired from the address maintenance list when the Index of the physical address indicates the fifth line, and if the Tag therein is equal to the Tag of the first virtual address, this item will be taken as the target item.

In a third possible embodiment, the address maintenance list is organized in a set associative manner. At this time, the Index of each item in the address maintenance list may also correspond to the Index of the physical address. On this basis, in step 603, a plurality of items corresponding to indexes may be acquired in the address maintenance list based on the Index of the physical address. In the above-mentioned plurality of items, it is determined whether the Tag of each item is equal to the Tag of the first virtual address. If yes, the corresponding item is taken as the target item of the first virtual address. For example, the address maintenance list may form four ways in the set associative manner. When the Index of the physical address indicates a fifth line, table information of the fifth line may be acquired for each way of the address maintenance list to obtain four items of table information, and one item therein which is equal to the Tag of the first virtual address is taken as the target item.

In some embodiments, the list domain of the address maintenance list may further include a valid bit. The valid bit may be configured to indicate whether the corresponding item is valid. For example, when the valid bit is 1, the item is valid, indicating that information stored in the virtual address corresponding to the item is valid. When the valid bit is 0, the item is invalid, indicating that information stored in the virtual address corresponding to the item is invalid or has been replaced. On this basis, the above-mentioned target items include a valid item, but not an invalid item.

Similarly to step 602, when the access instruction is triggered for the first time or the information has been replaced, the target item of the virtual address will not be queried in the address maintenance list, so it may jump to steps 604 and 605 for execution. Steps 604 and 605 may be processed simultaneously or sequentially, and a specific processing sequence of steps 604 and 605 is not limited in this embodiment.

In step 604, corresponding information is retrieved from a lower-level storage system based on the physical address corresponding to the virtual address.

In a possible implementation, when the virtual-real address conversion is not performed, the virtual address may be subjected to the virtual-real address conversion via TLB to obtain the corresponding physical address. Then a lower-level storage system, such as an L2 Cache, a memory, etc. is accessed, corresponding information is acquired and retrieved through the physical address, the corresponding information is stored in the current virtual address, and data is fed back to a memory access component which initiates the memory access instruction, or an instruction is returned to a fetch instruction component which initiates the fetch instruction.

In step 605, a target item corresponding to the virtual address is generated and added to the address maintenance list.

In a possible implementation, a new item of information may be added to the address maintenance list when the access is triggered for the first time or the data has been replaced.

The processing of generating the target item may be as follows. The Tag of the virtual address or physical address is taken as the target Tag, the address alias bit of the virtual address is taken as the target address alias bit, and the current Cache corresponding to the virtual address is taken as the target Cache to generate the target item.

When there is an empty item in a position where the target item may be stored in the address maintenance list, the target item may be added into any empty item. When there is no empty item in the position where the target item may be stored in the address maintenance list, any item may be replaced with the target item based on a replacement algorithm. The above-mentioned replacement algorithm may include a random replacement algorithm, a least recently used algorithm (LRU), a least frequently used algorithm (LFU), etc. The specific replacement algorithm is not limited in this embodiment. In addition, the Cache indicated by the replaced item may be accessed to invalidate information in the virtual address indicated by the replaced item.

In some embodiments, corresponding to a case where the Index of the address maintenance list corresponds to the Index of the physical address, the position where the target item may be stored refers to a position indicated by the Index of the physical address.

So far, an access flow corresponding to a virtual address has been introduced when the access instruction is triggered for the first time or the information is replaced. At this time, in the data Cache of the processor core receiving the memory access instruction, the retrieved data may be store on the data Cache line corresponding to the corresponding the virtual address Index. Alternatively, in the instruction Cache of the processor core receiving the fetch instruction, the above-mentioned retrieved instruction may be store on the instruction Cache line corresponding to the corresponding virtual address Index. When the processor core receives the memory access instruction to access the virtual address again, or the processor core fetches the instruction corresponding to the program counter of the virtual address again, information may be acquired from the corresponding virtual address after executing the above-mentioned steps 601 to 602, and there is no address alias.

An access method for another access instruction will be described below.

The address alias occurs when the virtual address of another access instruction is mapped to a same physical address. For the convenience of introduction, a virtual address of the above-mentioned another access instruction is referred to as a first virtual address, and a virtual address indicated by the address maintenance list is referred to as a second virtual address. The second virtual address and the first virtual address are mapped to the same physical address.

A corresponding first virtual address may be determined by executing the above-mentioned step 601 on the another access instruction, a Cache may be accessed and not hit may be determined by executing the above-mentioned step 602, a target item corresponding to the first virtual address may be determined by executing the above-mentioned step 603, and the execution may be skipped to step 606. The detailed processing of steps 601 to 603 is the same as that of the above, which will not be elaborated herein. Step 606 will be described below.

In step 606, a second virtual address is determined based on the first virtual address and the target item, and information in the second virtual address is set to be invalid.

Information recorded in the target item may include a target Tag, a target address alias bit, and a target Cache corresponding to the second virtual address.

In a possible implementation, the first virtual address and the second virtual address are mapped to the same physical address. That is, the Tag and Index are the same except for the address alias bit. Therefore, the first virtual address and information carried in the target item may constitute the second virtual address indicated by the target item.

In some embodiments, the processing in the above-mentioned step 606 may be as follows. The address alias bit is replaced with the target address alias bit in the first virtual address to obtain the second virtual address. The target Cache is accessed, and the information in the second virtual address is set to be invalid in the target Cache.

Of course, the second virtual address may be constructed in other ways. For example, information about the target Tag and the target address alias bit in the target item, and the first virtual address except the Tag and the address alias bit may be acquired to construct the second virtual address. The embodiment does not limit this.

The target Cache indicated by the target item may be accessed after determining the second virtual address. The processor core of the target Cache may be the processor core that received the above-mentioned another access, i.e., the current processor core, or another processor core, and the target Cache may be the instruction Cache or the data Cache. In the target Cache, the information stored in the second virtual address is set to be invalid.

Then, jump to step 607.

In step 607, information corresponding to the access instruction is acquired and written the information corresponding to the access instruction back to the first virtual address.

In a possible implementation, the detailed processing of step 607 is the same as that of the above-mentioned step 604. That is, the information in the physical address is acquired, and the acquired information is filled into the first virtual address, which will not be elaborated herein.

In another possible embodiment, the information in the second virtual address may be acquired and written the information in the second virtual address back, and the written back information may be filled into the first virtual address. At this time, an invalidating operation performed on the second virtual address may be an invalidating write back.

So far, only the first virtual address may store the valid information of the physical address, avoiding the second virtual address from continuing to store the valid information, and solving the address alias.

Since the address maintenance list at this time indicates the second virtual address, a jump may be made to step 607 to update the target item.

In step 608, the address maintenance list is updated based on the first virtual address.

The address alias bit in the target item is updated to the address alias bit of the first virtual address, when the address alias bit of the first virtual address is not equal to the address alias bit in the target item. In addition, the target Cache of the target item is updated as the current Cache, when the current Cache corresponding to the first virtual address is not equal to the target Cache.

In a specific implementation, each item of information in the target item may be determined, respectively, and corresponding information may be updated whenever a determination result is not equal. For an address maintenance list shown in FIG. 8, the address alias bit of the first virtual address and the address alias bit of the target item, as well as the current processor core and the processor core indicated by the target item, the current Cache and the target Cache indicated by the target item may be determined, respectively, and corresponding information is updated whenever a determination result is not equal.

In another specific embodiment, the alias bit of the target address may be directly updated to the address alias bit of the first virtual address without executing a determination. The target Cache is updated to the current Cache. That is, current Cache information is updated to target Cache information. For an address maintenance list shown in FIG. 8, the first identifier may be updated based on the current processor core, and the second identifier may be updated based on the current Cache being the instruction Cache or the data Cache. For the same information, there is naturally no change after the update.

In a subsequent process, when the memory access instruction is received or the fetch instruction is received, processing may be performed based on the above-mentioned introduced flow, and the consistency between the virtual address and the physical address may be maintained by using the address maintenance list to solve the address alias.

The present disclosure may obtain the following advantageous effects.

(1) The address maintenance list has a small amount of data and is easy to maintain, so that the processing efficiency may be improved while the address alias is solved.

(2) All the above-mentioned processes may be implemented based on a hardware, and a delay is smaller than that of a software.

(3) The address maintenance list may be a list of snoop filter, and the performance of the existing system is improved by multiplexing the snoop filter mechanism.

(4) The L2 Cache may no longer be used to store all information of the L1 Cache repeatedly, and the address alias may no longer be solved by maintaining the inclusion relationship, thus reducing the space occupation, making the L2 Cache have more space to handle other tasks and improving the performance of the existing system.

Figure 9:
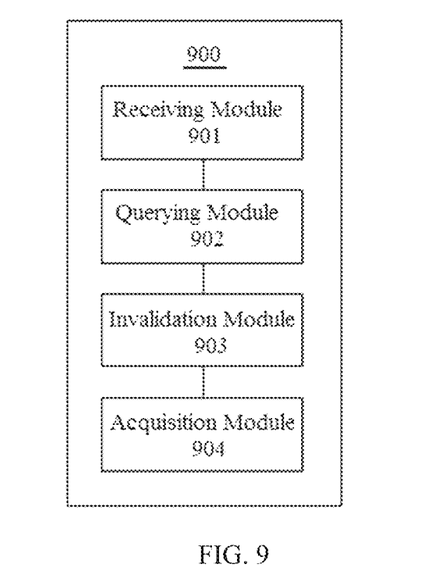
FIG. 9 is a block diagram showing an apparatus for solving a Cache address alias according to an embodiment of the present disclosure.

Embodiments of the present disclosure provide an apparatus for solving a Cache address alias, which is configured to implement the above-mentioned method for solving the Cache address alias. FIG. 9 is a schematic block diagram showing an apparatus for solving a Cache address alias according to an embodiment of the present disclosure. The apparatus 900 for solving the Cache address alias includes a receiving module 901, a querying module 902, an invalidation module 903, and an acquisition module 904.

The receiving module 901 is configured to determine a corresponding first virtual address based on a received access instruction.

The querying module 902 is configured to query an address maintenance list to determine a target item corresponding to the first virtual address when an access based on the first virtual address is not hit, information recorded in the target item including indicate a target Tag, a target address alias bit, and a target Cache.

The invalidation module 903 is configured to determine a second virtual address based on the first virtual address and the target item, and setting information in the second virtual address to be invalid, in which the second virtual address and the first virtual address are mapped to the same physical address.

The acquisition module 904 is configured to acquire information corresponding to the access instruction and writing the information corresponding to the access instruction back to the first virtual address.

In some embodiments, the apparatus further includes an update module. The update module is configured to update the address maintenance list based on the first virtual address.

In some embodiments, the update module is configured to update the target address alias bit to an address alias bit of the first virtual address, when the address alias bit of the first virtual address is not equal to the target address alias bit.

In some embodiments, the target Cache includes at least any one of: an instruction Cache or a data Cache of a current processor core, or an instruction Cache or a data Cache of another processor core, in which the current processor core is configured to receive the access instruction.

In some embodiments, the receiving module 901 is configured to acquire a first virtual address corresponding to a fetch instruction when the fetch instruction is received, the first virtual address corresponding to the fetch instruction being configured to access a program counter of an instruction Cache; or determine a first virtual address corresponding to a memory access instruction when the memory access instruction is received, the first virtual address corresponding to the memory access instruction being configured to access a data Cache.

In some embodiments, the receiving module 901 is configured to acquire the first virtual address of the fetch instruction based on the program counter.

In some embodiments, the querying module 902 is configured to determine a target item with a Tag that is equal to a Tag of the first virtual address based on the address maintenance list.

In some embodiments, the querying module 902 is configured to traverse the address maintenance list to determine whether a Tag of each item is equal to the Tag of the first virtual address; if yes, taking the corresponding item as the target item of the first virtual address; or acquire at least one item corresponding to an Index in the address maintenance list based on the Index of the physical address; in the at least one item, taking one item with a Tag that is equal to the Tag of the first virtual address as the target item.

In some embodiments, the update module is further configured to generate a target item if the target item corresponding to the first virtual address does not exist in the address maintenance list, and add the target item into the address maintenance list.

In some embodiments, the update module is configured to generate the target item by taking a Tag of the first virtual address or the physical address as the target Tag, taking an address alias bit of the first virtual address as the target address alias bit, and taking a current Cache corresponding to the first virtual address as the target Cache.

In some embodiments, the invalidation module 903 is configured to replace an address alias bit with the target address alias bit in the first virtual address to obtain a second virtual address; access the target Cache, and set information in the second virtual address to be invalid in the target Cache.

In some embodiments, the acquisition module 904 is configured to acquire the information in the second virtual address and write the information in the second virtual address back, and fill the written back information into the first virtual address; or acquire information in the physical address, and fill the information into the first virtual address.

In some embodiments, the first virtual address and the second virtual address are configured to access a L1 Cache.

In some embodiments, the address maintenance list is a list of snoop filter.

In some embodiments, a list domain of the address maintenance list includes a Tag, an address alias bit and Cache information.

In some embodiments, the Cache information includes a first identification of a processor core and a second identification of a Cache, the first identification being configured to indicate a processor core to which the Cache belongs, and the second identification being configured to indicate that the Cache is an instruction Cache or a data Cache.

In the embodiment of the present disclosure, the address maintenance list may be employed to determine whether address alias exists, and if so, the consistency between the virtual address and the physical address may be maintained based on the address maintenance list. In addition, the address maintenance list has a small amount of data and is easy to maintain, so that the processing efficiency may be improved while the address alias is solved.

Embodiments of the present disclosure also provide an electronic device including at least one processor; and a memory communicatively connected with the at least one processor. The memory is configured to store a computer program executable by the at least one processor that, when executed by the at least one processor, cause the electronic device to perform the method for solving a Cache address alias according to an embodiment of the present disclosure.

Embodiments of the present disclosure also provide a non-transitory computer-readable storage medium having stored therein a computer program that, when executed by a processor of a computer, cause the computer to perform the method for solving a Cache address alias according to an embodiment of the present disclosure.

Embodiments of the present disclosure also provide a computer program product including a computer program that, when executed by a processor of a computer, causes the computer to perform the method for solving a Cache address alias according to an embodiment of the present disclosure.

Embodiments of the present disclosure also provide a computer program including a computer program code that, when run on a computer, causes the computer to perform the method for solving a Cache address alias according to an embodiment of the present disclosure.

Figure 10:
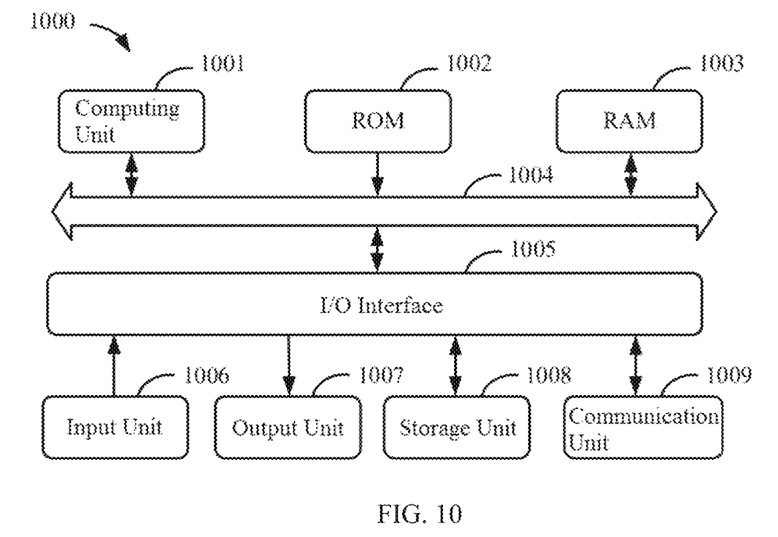
FIG. 10 is a block diagram showing an illustrative electronic device that may be used to implement embodiments of the present disclosure.

Referring to FIG. 10, a block diagram of an electronic device 1000 that may be a server or a client of the present disclosure, which is an example of a hardware device that may be applied to various aspects of the present disclosure, will now be described. An electronic device is intended to mean various forms of digital electronic computer devices, such as a data center server, a notebook computer, a thin client, a laptop computer, a desktop computer, a work station, a personal digital assistants, a blade server, a mainframe computer, and other suitable computers. The electronic device may also represent various forms of mobile devices, such as a personal digital processing, a cellular phone, a smart phone, a wearable device and other similar computing devices. Components shown herein, their connections and relationships, and their functions are merely exemplary, and are not intended to limit implementations of the present disclosure described and/or claimed herein.

As shown in FIG. 10, the electronic device 1000 includes a computing unit 1001, which may perform various appropriate actions and processes according to a computer program stored in a read only memory (ROM) 1002 or a computer program loaded from a storage unit 1008 into a random access memory (RAM) 1003. In the RAM 1003, various programs and data required for the operation of the device 1000 may also be stored. The computing unit 1001, the ROM 1002, and the RAM 1003 are connected to each other via a bus 1004. An input/output (I/O) interface 1005 is also connected to the bus 1004.

A number of components in the electronic device 1000 are connected to the I/O interface 1005, including an input unit 1006, an output unit 1007, the storage unit 1008 and a communication unit 1009. The input unit 1006 may be any type of device that may input information to the electronic device 1000. The input unit 1006 may receive input digital or character information and generate a key signal input related to user settings and/or function control of the electronic device. The output unit 1007 may be any type of device capable of presenting information, and may include, but is not limited to a display, a speaker, a video/audio output terminal, a vibrator, and/or a printer. The storage unit 1008 may include, but is not limited to a magnetic disk, and an optical disk. The communication unit 1009 allows the electronic device 1000 to exchange information/data with other devices through a computer network such as a computer network of the Internet and/or various telecommunications networks, and may include, but is not limited to a modulator-demodulator, a network card, an infrared communication device, a wireless communication transceiver and/or a chipset, such as a Bluetooth device, a WiFi device, a WiMax device, a cellular communication device and/or the like.

The computing unit 1001 may be various generic and/or specific processing components with processing and computing capabilities. Some examples of the computing unit 1001 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The calculation unit 1001 executes the various methods and processes described above. For example, in some embodiments, the method for solving the Cache address alias may be implemented as a computer software program tangibly embodied in a machine-readable medium, such as the storage unit 1008. In some embodiments, part or all of the computer program may be loaded and/or installed on the electronic device 1000 via the ROM 1002 and/or the communication unit 1009. In some embodiments, the computing unit 1001 may be configured by any other suitable means (for example, by means of a firmware) to execute the method for solving the Cache address alias.

The program code for implementing the method of the present disclosure may be written in any combination of one or more programming languages. These program code may be provided to processors or controllers of generic computers, specific computers or other programmable data processing devices that, when executed by the processors or controllers, cause functions/operations specified in the flow chart and/or block diagram to be implemented. The program code may be completely executed on the machine, partially executed on the machine, and partially executed on the machine, partially executed on a remote machine or completely executed on a remote machine or server as an independent software package.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable media may include, but is not limited to an electronic, magnetic, optical, electromagnetic, infrared, or semiconductor system, apparatus or device, or any suitable combination thereof. More specific examples of the machine-readable storage media will include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination thereof.

As used in the present disclosure, terms "machine-readable medium" and "computer-readable medium" refer to any computer program product, device, and/or apparatus (e.g., a magnetic disk, an optical disk, a memory, a programmable logic device (PLD)) used to provide machine instructions and/or data to a programmable processor, including a machine-readable medium that receives a machine instruction as a machine-readable signal. The term "machine readable signal" refers to any signal used to provide a machine instruction and/or data to a programmable processor.

To provide interaction with a user, a system and a technology described herein may be implemented on a computer. The computer has a display device (for example, a cathode ray tube (CRT) or a liquid crystal display (LCD) monitor) for displaying information to the user, a keyboard and a pointing device (for example, a mouse or a trackball) through which the user may provide input to the computer. Other kinds of apparatuses may also be used to provide interaction with the user. For example, a feedback provided to the user may be any form of sensory feedback (e.g., a visual feedback, an auditory feedback, or a tactile feedback), and the input from the user may be received in any form (including an acoustic input, a voice input or a tactile input).

The system and technology described herein may be implemented in a computing system including a back-end component (e.g., as a data server), a computing system including a middleware component (e.g., an application server), or a computing system including a front-end component (e.g., a user computer with a graphical user interface or a web browser through which the user may interact with an implementation of the system and technology described herein), or in a computing system that includes any combination of the back-end component, the middleware component, or the front-end component. The components of the system may be connected to each other by digital data communication in any form or medium (e.g., a communication network). Examples of the communication network include a local area network (LAN), a wide area network (WAN) and the Internet.

The computer system may include a client and a server. The client and the server are generally far away from each other and generally interact through the communication network. The relationship between the client and the server is generated by running computer programs on the corresponding computer that have a client-server relationship with each other.

All embodiments of the present disclosure may be executed separately or in combination with other embodiments, which are regarded as the scope of protection required by the present disclosure.

What is claimed is:

1. A method for solving a Cache address alias, characterized in that the method comprises:
   determining a corresponding first virtual address based on a received access instruction to a Cache;
   querying an address maintenance list to determine a target item corresponding to the first virtual address when an access based on the first virtual address does not result in a hit in a Tag of the Cache, information recorded in the target item being configured to indicate a target Tag, a target address alias bit, and a target Cache;
   determining a second virtual address based on the first virtual address and the target item, and setting information in the second virtual address to be invalid, wherein the second virtual address and the first virtual address are mapped to the same physical address; and
   acquiring information corresponding to the access instruction and writing the information corresponding to the access instruction back to the first virtual address.

2. The method of claim 1, wherein the method further comprises:
   updating the address maintenance list based on the first virtual address.

3. The method of claim 2, wherein updating the address maintenance list based on the first virtual address comprises:
   updating the target address alias bit to an address alias bit of the first virtual address, when the address alias bit of the first virtual address is not equal to the target address alias bit.

4. The method of claim 1, wherein the target Cache comprises at least any one of: an instruction Cache or a data Cache of a current processor core, or an instruction Cache or a data Cache of another processor core, wherein the current processor core is configured to receive the access instruction.

5. The method of claim 1, wherein determining the corresponding first virtual address based on the received access instruction comprises:
   acquiring a first virtual address corresponding to a fetch instruction when the fetch instruction is received, the first virtual address corresponding to the fetch instruction being configured to access an instruction Cache; or
   determining a first virtual address corresponding to a memory access instruction when the memory access instruction is received, the first virtual address corresponding to the memory access instruction being configured to access a data Cache.

6. The method of claim 5, wherein acquiring the first virtual address corresponding to the fetch instruction comprises:
   acquiring the first virtual address corresponding to the fetch instruction based on a program counter.

7. The method of claim 1, wherein querying the address maintenance list to determine the target item corresponding to the first virtual address comprises:
   determining a target item with a Tag that is equal to a Tag of the first virtual address based on the address maintenance list.

8. The method of claim 7, wherein determining the target item with the Tag that is equal to the Tag of the first virtual address based on the address maintenance list comprises:
   traversing the address maintenance list to determine whether a Tag of each item is equal to the Tag of the first virtual address; if yes, taking the corresponding item as the target item of the first virtual address; or
   acquiring at least one item corresponding to an Index in the address maintenance list based on the index of the physical address; in the at least one item, taking one item with a Tag that is equal to the Tag of the first virtual address as the target item.

9. The method of claim 1, wherein the method further comprises:
generating a target item if the target item corresponding to the first virtual address does not exist in the address maintenance list, and adding the target item into the address maintenance list.

10. The method of claim 9, wherein generating the target item comprises:
generating the target item by taking a Tag of the first virtual address or the physical address as the target Tag, taking an address alias bit of the first virtual address as the target address alias bit, and taking a current Cache corresponding to the first virtual address as the target Cache.

11. The method of claim 1, wherein determining the second virtual address based on the first virtual address and the target item, and setting the information in the second virtual address to be invalid comprises:
replacing an address alias bit with the target address alias bit in the first virtual address to obtain a second virtual address; and
accessing the target Cache, and setting the information in the second virtual address to be invalid in the target Cache.

12. The method of claim 1, wherein acquiring the information corresponding to the access instruction and writing the information corresponding to the access instruction back to the first virtual address comprises:
acquiring the information in the second virtual address and writing the information in the second virtual address back, and filling the written back information into the first virtual address; or
acquiring information in the physical address, and filling the information into the first virtual address.

13. The method of claim 1, wherein the first virtual address and the second virtual address are configured to access a L1 Cache.

14. The method of claim 1, characterized in that the address maintenance list is a list of snoop filter.

15. The method of claim 1, characterized in that a list domain of the address maintenance list comprises a Tag, an address alias bit and Cache information.

16. The method of claim 15, wherein the Cache information comprises a first identification of a processor core and a second identification of a Cache, the first identification being configured to indicate a processor core to which the Cache belongs, and the second identification being configured to indicate that the Cache is an instruction Cache or a data Cache.

17. An electronic device, comprising:
a processor; and
a memory for storing a program;
wherein the program comprises an instruction that, when executed by the processor, causes the processor to:
determine a corresponding first virtual address based on a received access instruction to a Cache;
query an address maintenance list to determine a target item corresponding to the first virtual address when an access based on the first virtual address does not result in a hit in a Tag of the Cache, information recorded in the target item being configured to indicate a target Tag, a target address alias bit, and a target Cache;
determine a second virtual address based on the first virtual address and the target item, and set information in the second virtual address to be invalid, wherein the second virtual address and the first virtual address are mapped to the same physical address; and
acquire information corresponding to the access instruction and write the information corresponding to the access instruction back to the first virtual address.

18. The electronic device of claim 17, wherein the processor is configured to:
update the address maintenance list based on the first virtual address.

19. A non-transitory computer-readable storage medium having stored therein computer instructions, wherein the computer instructions are configured to cause a computer to:
determine a corresponding first virtual address based on a received access instruction to a Cache;
query an address maintenance list to determine a target item corresponding to the first virtual address when an access based on the first virtual address does not result in a hit in a Tag of the Cache, information recorded in the target item being configured to indicate a target Tag, a target address alias bit, and a target Cache;
determine a second virtual address based on the first virtual address and the target item, and set information in the second virtual address to be invalid, wherein the second virtual address and the first virtual address are mapped to the same physical address; and
acquire information corresponding to the access instruction and write the information corresponding to the access instruction back to the first virtual address.

20. The non-transitory computer-readable storage medium of claim 19, wherein the computer is configured to:
update the address maintenance list based on the first virtual address.

* * * * *